United States Patent

[11] 3,591,841

| [72] | Inventors | Knut Heitmann<br>Wetzlar;<br>Eckart Schneider, Berghausen; Ludwig<br>Leitz, Wetzlar, all of, Germany |
|---|---|---|
| [21] | Appl. No. | 793,711 |
| [22] | Filed | Jan. 24, 1969 |
| [45] | Patented | July 6, 1971 |
| [73] | Assignee | Ernst Leitz GmbH<br>Wetzlar, Germany |
| [32] | Priority | Jan. 29, 1968 |
| [33] | | Austria |
| [31] | | A 882/68 |

[54] OPTICAL DEVICE FOR DETERMINING EXTENT OF MOVEMENT
8 Claims, 7 Drawing Figs.

[52] U.S. Cl. .................................................. 250/231 R,
250/237 G, 250/220 R, 340/271
[51] Int. Cl. ..................................................... G01d 5/34
[50] Field of Search ............................................ 250/237 G,
231 SE, 209, 208, 220; 313/169; 340/271

[56] References Cited
UNITED STATES PATENTS

| 2,416,968 | 3/1947 | Turrettini .................... | 250/237 |
| 2,832,259 | 4/1958 | Merton ........................ | 250/237 |
| 2,886,717 | 5/1959 | Williamson et al. .......... | 250/237 |
| 3,014,134 | 12/1961 | Bower ......................... | 250/237 |
| 3,427,463 | 2/1969 | Weyrauch .................... | 250/237 |

Primary Examiner—Walter Stolwein
Attorney—Krafft and Wells

ABSTRACT: An apparatus for measuring the linear or angular movement of an object being provided with two graduation carriers movable relative to one another; one of the carriers being connectable to the object to be measured, the other one being connectable to a reference body. The apparatus further comprises means for illuminating one of the graduation carriers, means for projecting an image of the illuminated carrier on the other carrier, photoelectric means for sensing the carriers, and electronic evaluation means for processing the signals from the photoelectric means so as to provide output signals usable for digital indication or for control purposes. The first of the two graduation carriers having linear graduations comprising transparent or reflective striplike marks, the ratio of the graduation interval to the mark width corresponding, in the direction of the relative movement, to the desired number of interval fractions per graduation interval, and the second graduation carrier having one or a plurality of sensing fields the number of which is less than the desired number of interval fractions and which together form a combination of image patterns, each of these sensing fields having a plurality of striplike, light-permeable and light-impermeable portions of its surface area which are parallel with the marks of the first graduation carrier and which are unequal inter se in such a way that, upon relative movement of the graduation carriers over a distance corresponding to a graduation interval, different combinations of image patterns are produced which correspond in number to the desired number of interval fractions per graduation interval.

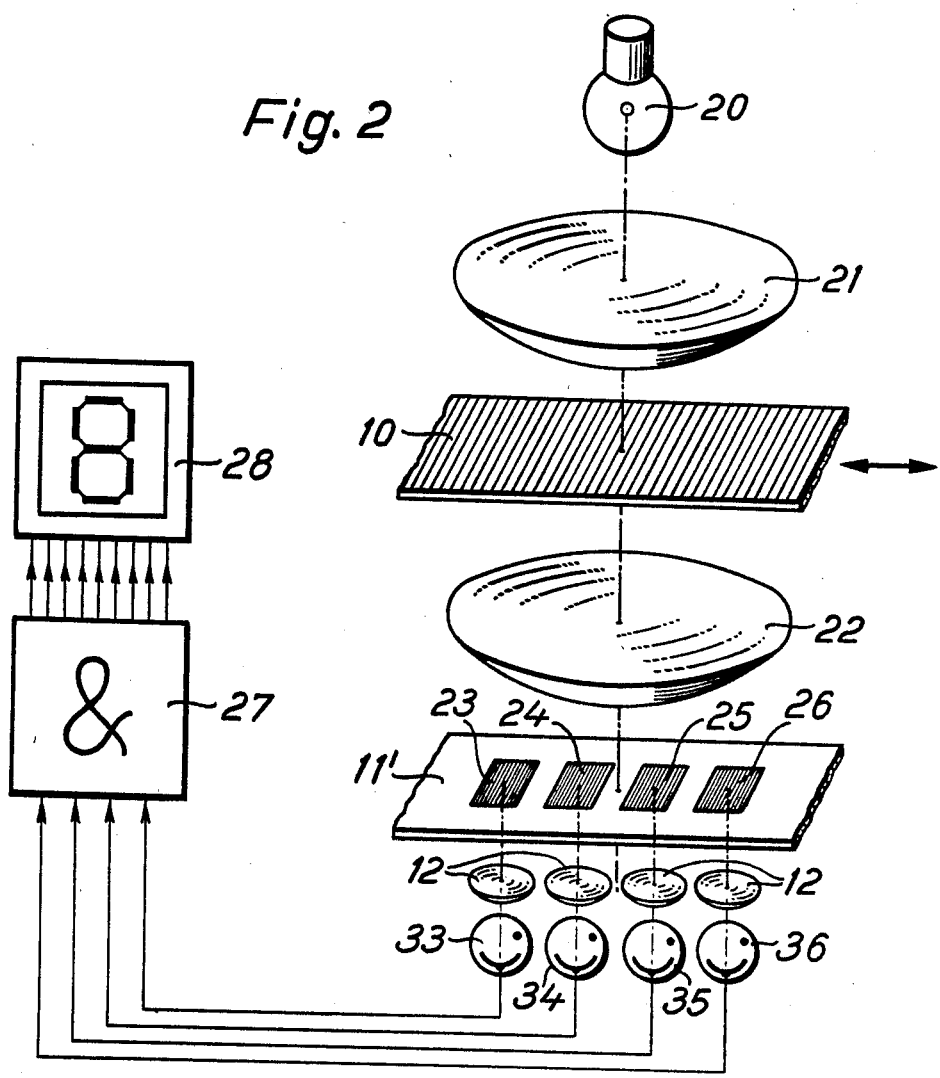

Fig. 3
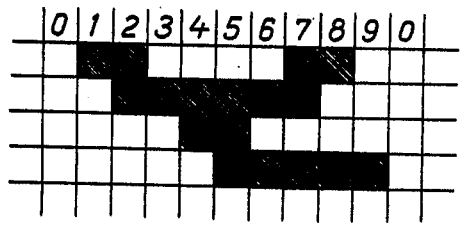
a
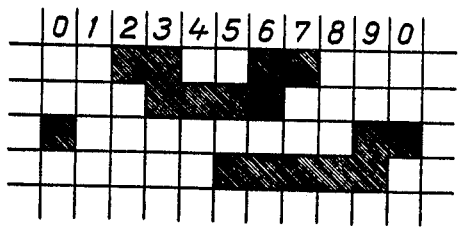
b
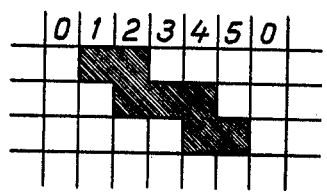
c
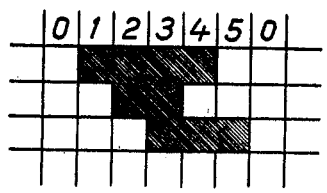
d

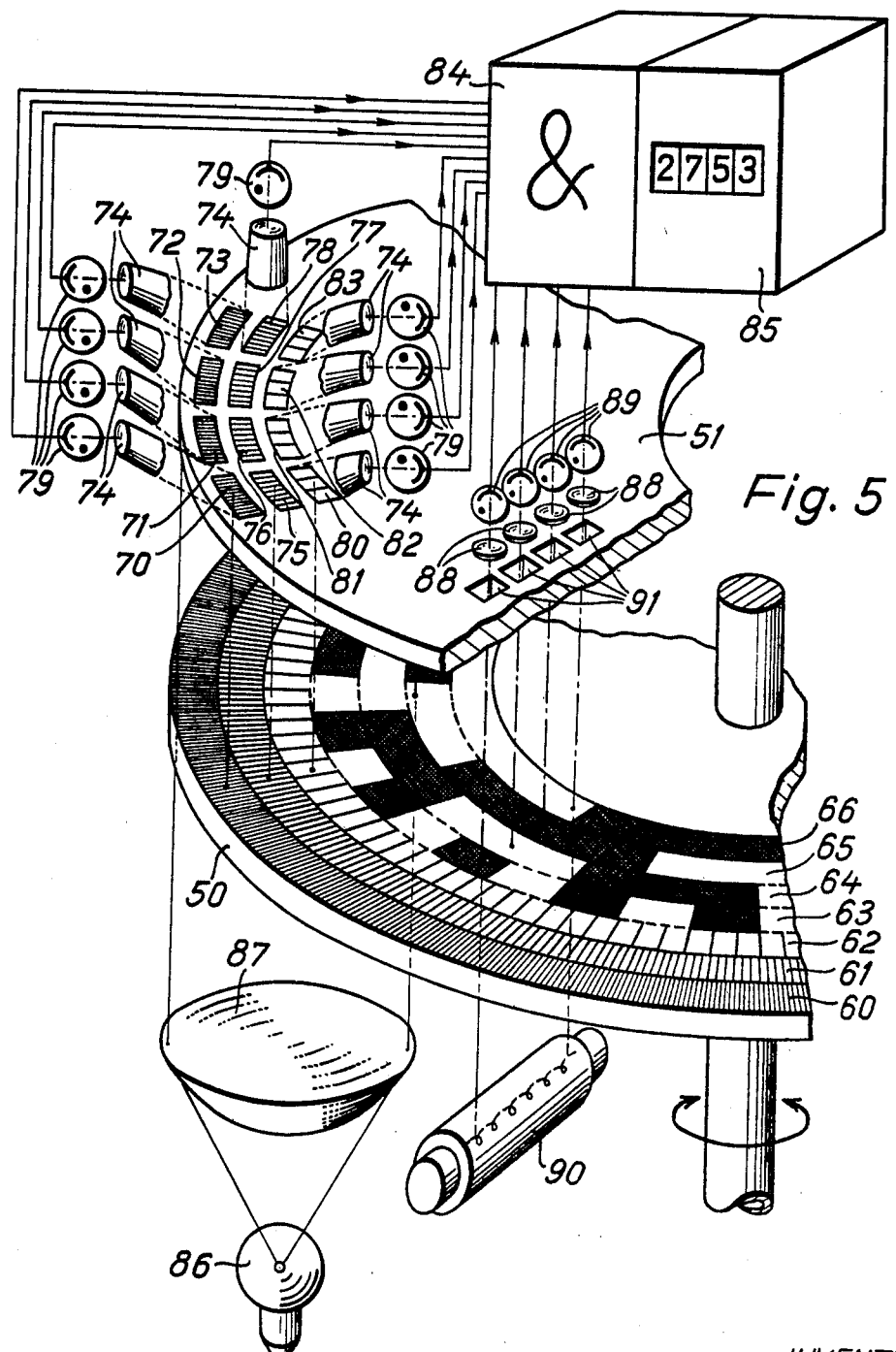

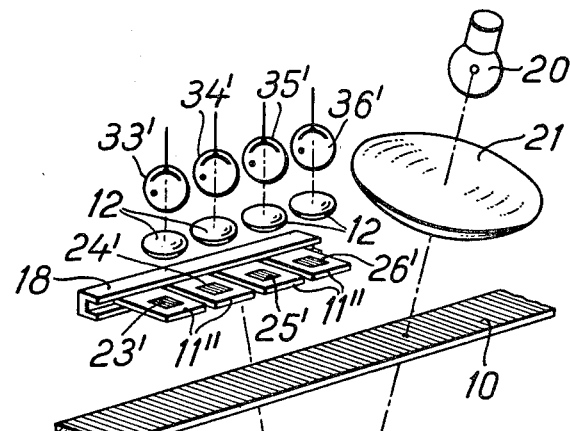
Fig. 6
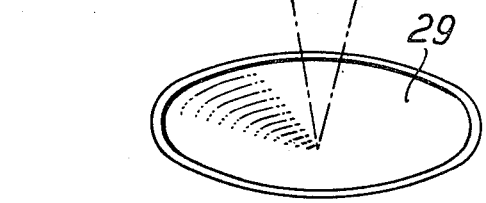
Fig. 7
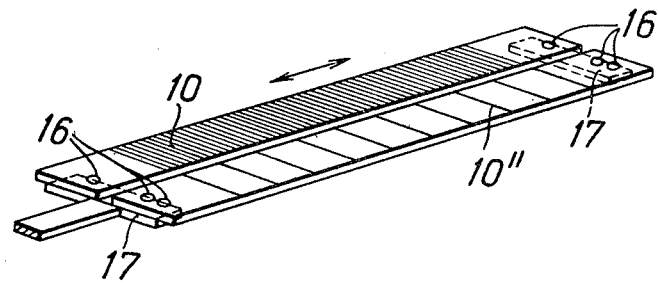

OPTICAL DEVICE FOR DETERMINING EXTENT OF MOVEMENT

BACKGROUND OF THE INVENTION

The present invention relates to a measuring apparatus. More specifically, the invention relates to a measuring apparatus of the type having two graduation carriers movable relative to one another, an illumination device, photoelectric sensing means and electronic evaluation means.

German Pat. No. 639,966 discloses a device for indicating small movements, which device includes fields of indication of which one or more are illuminated in different colors, depending on the position of the measuring mechanism. The optical system connected to the measuring system comprises a grating with marks thereon the distance of which is of a dimension equal to the movement to be measured of the displaceable element. Two or three illuminations of different color can be provided corresponding to the zero position of the pointer and to its deviations therefrom.

Further, from an article "Moiretechnik, Stand und Entwicklungstendenzen" having appeared on June 7, 1963 in the German periodical "Maschinenmarkt Wurzburg," page 23, there is known a device comprising two gratings arranged close together of which at least one has a ratio of the graduation interval to the mark width which differs from 1:1, thereby making it possible to individualize the steps of movement.

With such a device figures and letters will constantly appear throughout the whole surface of the upper grating, or at least throughout a large portion thereof if the gratings are displaced relative to one another.

Still further, the English Pat. No. 816,336 shows an electric analogue-digital encoder including a light source illuminating a plate having slots extending in a direction normal to the direction of movement of the plate. The plate is connected to an element the movement of which is to be analyzed. An optical system being provided which images the slotted plate on a code-plate, the latter having four code tracks extending in the direction of movement of the slotted plate. A photoelectric receiver being assigned to each code track.

The light rays transmitting the tracks are separated from one another by screens in such a way that each photoelectric receiver can only receive light if light impinges on the light-permeable portions of the track to which this particular receiver is assigned. This device performs proper encoding only if but one of the slots of the slotted plate is illuminated or if but one of these slots is imaged on the code plate. When the image of one of the slots has moved to the end of the code tracks and is about to leave them, the image of the next slot appears at the other end of the tracks. Thus, the slots of the plate are employed subsequently for producing the code signals. For this reason, the device is very sensitive to dirt accumulation. Besides, the slots of the plate must be positioned very accurately or there will occur an ambiguous encoding or a lapse in the encoding.

Moreover, it is known to employ for the measurement of lengths and angles photoelectric receivers and incremental transducers having digital indication. The result of the measurement is obtained by counting the intervals between two points of the measurement by means of electronic counters. It is a disadvantage, however, that the latter are very sensitive to outside pulses and, in case of interruption of the current circuit, will lose the result of the counting, i.e. the information on the measured spot.

Finally, there is known (for example by a printed article "Lichtelektrischer Analog-Digital-Wandler fur Langenmessungen, Winkelmessungen," particularly on page 17 thereof, edited by the firm of Dr. Johannes Heidenhaim of Traunreut, Germany) a device which makes use of a pure binary code. With this type of code, marks and intervals are used in each code track which are double the size of those in the previous track. In order to read these graduations properly it is necessary to employ a whole sequence of photoelectric receivers. The reason therefore being that with a pure binary code a transition from one line to the next entails a simultaneous change of marks in a plurality of tracks. As a result, two photoelectric receivers must be provided for every track except the first. An electronic evaluation means connected to the receivers then decides automatically which one of the receivers has provided the proper signal; the electronic evaluation means being controlled by signals of the previous track via appropriate junction stages. Subdivision and encoding of a length or angle interval into $2n$ fractions thus requires $n$ tracks with $2n-1$ photoelectric receivers. Additionally, a rather complicated computer is required if the evaluation of the signals calls for an indication of these signals in decimal form.

It is another disadvantage of the known coded measuring system that the code graduation requires a plurality of code tracks to which an appropriate number of photoelectric receivers must be assigned. Moreover, the master graduation for each code track is subject to a particular working process since different tracks have different graduation intervals, and further, special care must be taken to properly align the different tracks relative to one another. This, however, requires additional efforts and becomes more and more difficult with increasing fineness of the graduation.

It is, therefore, the object of the invention to provide a new apparatus for measuring lengths and angles using photoelectric sensing methods and coding and still employing graduations which are simple in design and easy to manufacture.

It is another object of the invention to provide a measuring apparatus indicating the result of the measurement in digit form and overcoming the above mentioned disadvantage of the prior art devices. The new apparatus is designed to guarantee proper sensing of the graduation even if some marks thereof cannot be used for sensing on account of dirt accumulation or damages.

SUMMARY OF THE INVENTION

The above-stated objects are attained by providing an apparatus comprising two graduation carriers movable relative to one another, means for illuminating one of the graduation carriers and thereby projecting an image of the illuminated carrier on the other carrier, one carrier being connectable to the object, and the other carrier being connectable to a reference body, photoelectric means for sensing the graduation carriers, and electronic evaluation means for processing the signals from the photoelectric means so as to provide output signals usable for digital indication or for control purposes, a first of the two graduation carriers having linear graduations comprising transparent or reflective striplike marks, the ratio of the graduation interval to the mark width corresponding, in the direction of the relative movement, to the desired number of interval fractions per graduation interval, and the second graduation carrier having one of a plurality of sensing fields the number of which is less than the desired number of interval fractions and which together form a combination of image patterns, each of these sensing fields having a plurality of striplike, light-permeable and light-impermeable portions of its surface area which are parallel with the marks of the first graduation carrier and which are unequal inter se in such a way that, upon relative movement of the graduation carriers over a distance corresponding to a graduation interval, combinations of image patterns are produced which correspond in number to the desired number of interval fractions per graduation interval.

Preferably, the marks of the first graduation carrier have their longitudinal axes at right angles to the direction of movement to be measured. The photoelectric means may comprise a plurality of photoelectric receivers, each associated with one sensing field or alternatively a photoelectric receiver could be used which consecutively senses a plurality of sensing fields.

One of the graduation carriers may include a plurality of separate graduation carrier members disposed serially in the direction of movement or alongside one another. An optical projection system may be provided between the two graduation carriers and may be a mirror optical system.

The arrangement of the light-permeable and light-impermeable portions of the surface area of the sensing fields may be so selected that the combinations of image patterns arising upon relative movement of the two graduation carriers represent a single-step code which is cyclic with the number of interval fractions.

An additional graduation carrier which is coarser in its fineness of graduation by one factor but is otherwise equivalent to the first graduation carrier may be provided, appropriate additional photoelectric means for the sensing thereof, and an electronic evaluating means for processing the signals from these photoelectric means being also provided the coarser graduation carrier being rigidly coupled to the corresponding first graduation carrier.

The coupling may be achieved by arranging the graduations on a single member which thereby performs the function of two carriers.

Additional graduations may be provided on each carrier, which additional graduations are coarser in their fineness than the main graduations by a factor, the width of the markings on this additional graduation corresponding to the width of the markings of the finer main graduations of the carriers. The markings of the additional graduations may be an extension of markings of the finer main graduations. The graduation carriers may additionally have code tracks known per se.

At least one light conductor may be incorporated between the photoelectric means and the sensing fields.

DESCRIPTION OF THE DRAWINGS

The invention will be more readily understood from the following description when taken in conjunction with the appending drawings, wherein:

FIG. 2 shows one embodiment of an apparatus according to the invention;

FIG. 3 shows examples of coding;

FIG. 5 shows another embodiment of the apparatus;

FIG. 6 shows a further embodiment with graduation carriers situated beside one another;

FIG. 7 shows the coupling of two graduation carriers;

DESCRIPTION OF THE PREFERRED EMBODIMENTS

Figure 1:
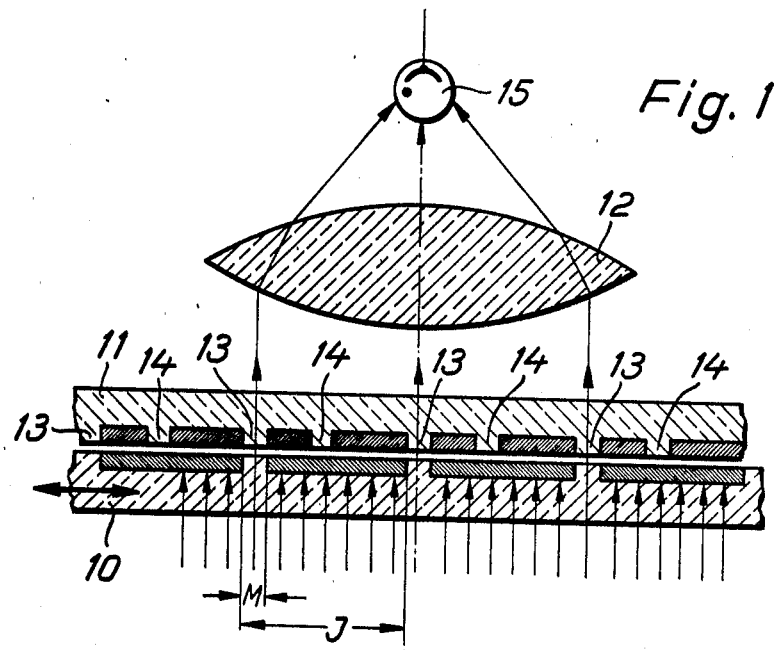
FIG. 1 is a diagram for explaining the manner in which an apparatus according to the invention operates.

Referring now to the drawings, FIG. 1 shows two graduation carriers 10, 11 mounted in a closely superimposed relationship and adapted to be displaced relatively to each other in the direction of the double-headed arrow. The carrier 10 has, in the sensing zone defined by an optical system 12, periodically regular graduations, the ratio graduation interval J: marking width M corresponds to a desired number of interval graduations (10 in the example illustrated).

The carrier 11 is provided with two marks 13 and 14 of the width M for each graduation interval J. When the two graduation carriers are opposite each other in the position illustrated, then light emanating from below the carrier 10 passes through the marks of the carrier 10 and the marks 13 of the carrier 11 as well as the optical system 12 onto a photoelectric receiver 15 disposed behind the optical system 12. All the marks 13 located in the sensing zone form part of the flux of light striking this receiver. It will be realized that the strips of light produced by the marks 13 then combine to form an image pattern if the graduations are made correspondingly fine, so that the marks 13 are no longer individually visible but can only be recognized as an image pattern when regarded as a whole. It will furthermore be recognized that the disappearance of one of the marks due to dirt or damage will not affect the overall image pattern. If, then, the graduation carrier 10 is displaced rightwardly in relation to the graduation carrier 11, by a displacement of one, two or three mark widths M, the photoelectric receiver will not receive any light. Only when a displacement by four mark widths occurs does an image pattern reappear and the photoelectric receiver 15 will emit an appropriate signal. Upon further displacement, an image pattern will only recur after a travel of six mark widths. Therefore, by construction of the graduation of the carrier 11, it is possible to determine how much displacement of the carrier 10 must take place before an image pattern is repeated.

FIG. 2 illustrates diagrammatically the construction of an arrangement in which graduation carriers of the type described in FIG. 1 are used. The graduation carrier 10 is mounted so as to be displaceable parallel with the plane of the drawing in directions indicated by the double arrow. It is illuminated through a condenser 21 by a lamp 20 and an image of it is formed by an optical system 22 on a graduation carrier 11' which is mounted so as to be stationary. The graduation carrier 11' in four sensing fields 23, 24, 25, 26, graduations prepared in accordance with the basic principles illustrated in FIG. 1 in conjunction with the graduation of the graduation carrier 11. In this respect, the marks are so placed in the individual graduation fields that, according to the length of the displacement path of the graduation carrier 10, light always passes through only one of these graduation fields or through a combination of a plurality of combinations, so that, upon displacement, one particular combination of image patterns, different from the others, appears in the sensing fields for each interval fraction. The graduation fields 23—26 are each followed by an optical system 12, which is in turn followed by a photoelectric receiver 33—36, the output signals from which correspond to the image pattern combination. Immediately following these receivers is an electronic evaluating means 27 containing a synchronizing circuit to serve as a coupling member and which converts the coded signals into one of 10 signals to operate a digital indicating stage 28. In the case of the arrangement illustrated, only four graduation fields are provided for the graduation carrier 11', although it is intended that the indication shall be decimal. This presupposes the image pattern combination arising upon displacement of the graduation carrier 10 obeying a code. Single-step codes which are cyclic with the number of desired interval fractions are particularly suitable for this purpose.

Examples of such codes are shown in FIG. 3; in fact, embodiments a and b show appropriate decimal codes while lines c and d on the other hand show a sexagesimal code.

As stated above, FIG. 1 illustrates a graduation carrier on which the ratio of interval width J: marking width M is equal to 10, in other words the individual graduation intervals are subdivided into 10 equal parts. In this case, the width of the individual graduation intervals is as small as possible but may otherwise be as desired. The displacement of the graduation carrier 10 by more than the width of a graduation interval results in a cyclic repetition of the same image combinations. It is therefore essential to provide further means for defining the individual intervals, said means thus resulting an unequivocal indication.

One of such means would be a counter to count the passage of marks. However, as has already been stated above, such counters are burdened by certain disadvantages which would nullify a complete solution of the problem on which the invention is based.

Instead, however, it is logical to associate with the graduations of the two graduation carriers 10 and 11 or 10 and 11' appropriate graduations which are, however, coarser by a factor (logically of the magnitude "10" in the case of a decimal system). These graduations may be applied on the same graduation carriers but may also be located on additional graduation carriers which are coupled for rigid movement with the graduation carriers 10 and 11 or 10 and 11' at least during the measuring process. If additional graduation carriers are used, then it becomes possible for the measuring operation to be divided into a coarse measurement prior to coupling and a fine measurement with the coupled graduation carriers 10 and 11 or 10 and 11'.

The graduation carriers can also be at all times rigidly connected to one another, as is shown for example for two graduation carriers 10 and 10'' in FIG. 7. In this case, the two graduation carriers are secured by means of screws 16 on common strips which are in turn connected to the object whose movement is to be measured.

If two sets of graduations according to the invention are provided, in which the graduations are of different degrees of fineness but otherwise identical in their construction, and are coupled together, then the finer graduations provide the information of where the measurement point is located within a graduation interval while the coarser graduations, on the other hand, provide information as to the graduation interval within which this measurement point is located.

It is sensible for the markings in the coarser graduation, associated with the graduation carrier 10, to be made only as wide as the markings of the finer graduation. In consequence of this, the variations in brightness during reciprocal passage of the markings of the two carriers over one another during the displacement process arise very suddenly, so that the photoelectrical receivers can be controlled with considerable reliability.

Figure 4:
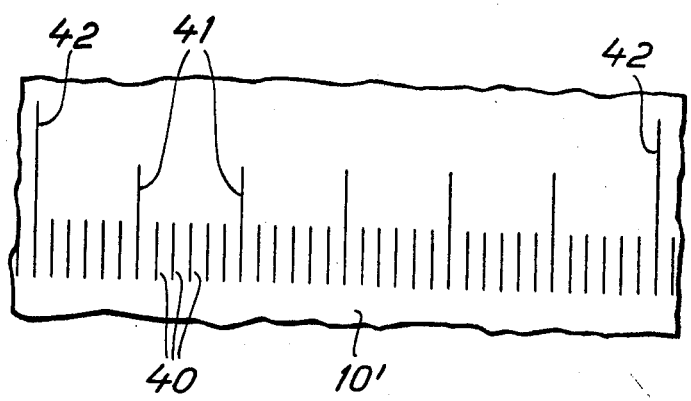
FIG. 4 is a portion of a graduation which may be used with the apparatus in accordance with the invention.

In addition, however, there is the outstanding advantage that markings associated with graduations of different fineness, can be made in a common operation and using the same scribing tool. This tool is so controlled thereby that it leaves a relatively long track behind at clearly defined locations to serve as markings. An example of such a marking is shown in FIG. 4. A carrier 10' has applied on it markings which permit of sexagesimal indication of the measurement result. The markings 40 thereby correspond to the markings on the carrier 10 in FIG. 1. The markings 41 fulfil a dual function, in that their bottom parts correspond to the markings 40 while their upper parts, however, form the markings for the coarser graduation. The markings 42 on the other hand satisfy in this respect a threefold function. It will readily be appreciated that such markings can be produced during a single graduation process, so that the correct spatial relationship of the individual graduations to one another is automatically guaranteed.

The arrangement of photoelectric receivers as shown in FIG. 2 provides the advantage that the individual mark tracks can be kept relatively narrow, so that the manufacture of graduations in accordance with what is revealed in FIG. 4 is favored. In addition, however, it is a further advantage that the new arrangement is, as regards reading, relatively insensitive to a tilting of the graduation carriers transversely to the direction of movement. If it is desired to forgo these advantages, then the arrangement can also be so made that the photoelectric receivers are situated one beside another in relation to the direction of movement of the graduation carriers.

All that has so far been stated has been explained with reference to graduations adapted to perform a linear movement in respect of one another. It is, however, also true of radial divisions. Such an arrangement is illustrated diagrammatically in FIG. 5. The two graduation carriers 50, 51 are illustrated as horizontal and at a certain distance from each other, so that the graduations located on the carrier 50 can be discerned. In actual fact, the two carriers are guided in superimposed relationship, as close to each other as possible. The graduation carrier 50 exhibits seven mark tracks 60–66, of which the three first-mentioned correspond to the illustration of FIG. 4. The other tracks are component parts of the normal coding of known type, which is entirely suitable for the representation of coarse values. Opposite the rotatably-mounted graduation carrier 50 is the rigidly-mounted carrier 51 which is provided with graduations 70–73 or 75–78 or 80–83 which correspond to the graduations 23–26 shown in FIG. 2. The graduations 70–73 are associated with graduation tracks 60 of carrier 50, the graduations 75–78 are associated with graduation track 61 and graduations 80–83 are associated with graduation track 62. Light from each of the graduations 70–73, 75–78 and 80–83 passes via a light conductor 74 to a photoelectric receiver 79 which senses the image pattern (for the sake of clarity, the light conductors and receivers for the graduations 75, 76 and 77 have not been illustrated in this drawing). These receivers are connected to an electronic evaluation means 84, which is followed in the circuit by an indicating stage 85 for the digital indication of the measured value. The graduation tracks 60–62 are illuminated by means of a lamp 86 which is followed by a condenser 87.

The code tracks 63–64 are scanned in known manner in that there are in the carrier 51 four radially adjacently disposed recesses 91 and adapted in their size to the individual fields of the code tracks and which are scanned by photoelectric receivers 89 through collector lenses 88. These receivers are likewise connected to the electronic evaluating means 84. The code tracks 63–66 are illuminated by a tubular bulb 90 which has its filament disposed radially to the axis of rotation of the graduation carrier 50.

Modifications to the above described apparatus are possible. For example, instead the lens optical system shown in FIG. 2, a mirror optical system may be used, although this does necessitate a different arrangement of the graduation carriers, and such a system provides well-known optical advantages (for example simplicity, freedom from color fringes and, in the case of 1:1 representation, a high aperture without spherical aberration in the middle of the picture).

An example of such a mirror optical system is shown in FIG. 6, where only the middle ray of the light beam is illustrate. Through a condenser lens 21, a lamp 20 illuminates a graduation carrier 10 an image of which is projected by a concave mirror onto further graduation carriers 11'' disposed alongside the graduation carrier 10. These graduation carriers are secured in a U-shaped field 23'–26' which is sensed through a lens 12 by a photoelectric receiver 33'–36'. The image patterns of these sensing fields together form the combined image pattern. The signals arising at the photoelectric receivers are evaluated in the manner already described.

Naturally, instead of the four photoelectric receivers, as shown in FIG. 2, it is possible to use only one such receiver which, for example with the aid of known optical means such as rotating shutters with a radial or spiral slot, oscillating slotted shutters, oscillating mirrors etc., senses the image patterns one after another cyclically.

Figure 8:
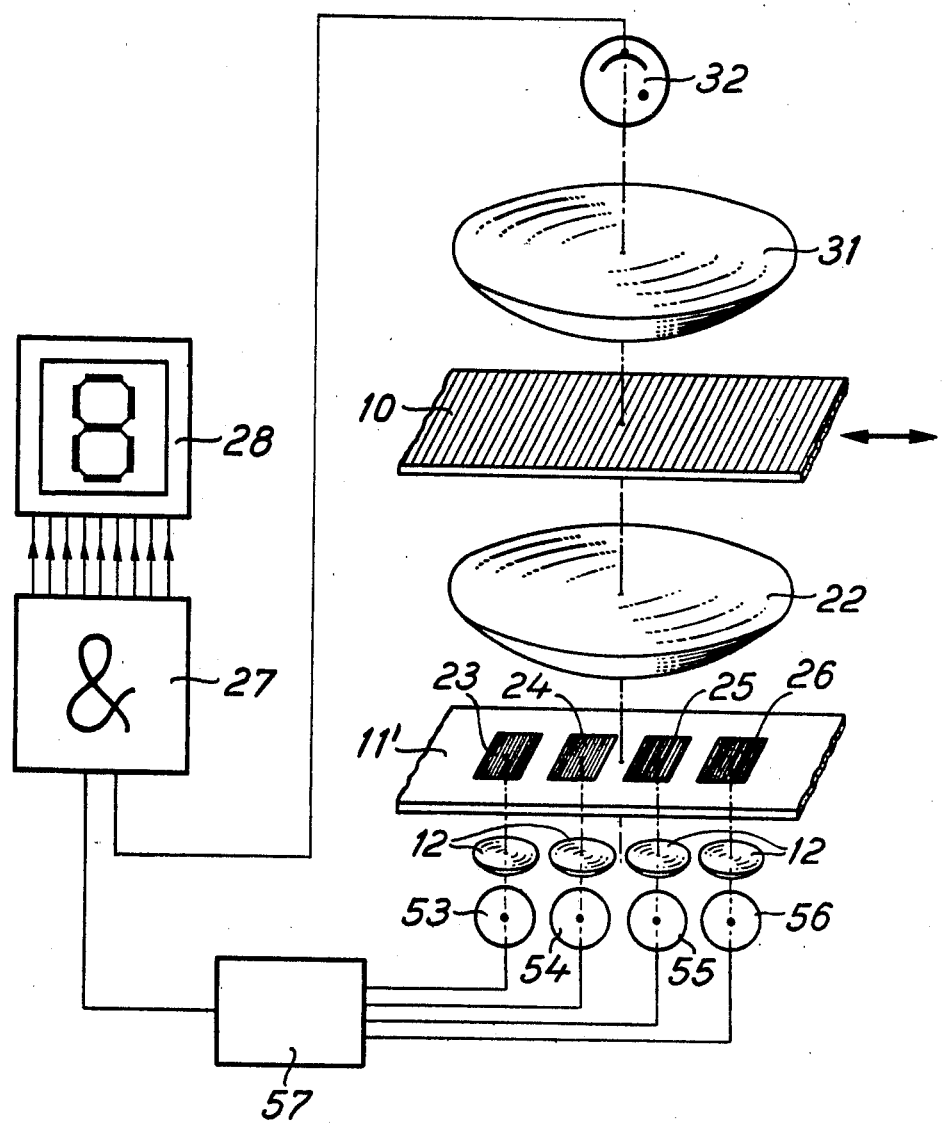
FIG. 8 shows another embodiment having only one photoelectric receiver.

A special example of the consecutive sensing of a plurality of sensing fields in the sensing zone by means of only one photoelectric receiver is shown in FIG. 8. In this case, each of the four lamps 53–56 illuminates a graduation field of a graduation carrier 11' through an optical system 12. This graduation carrier is stationary. It carries in the four sensing fields 23–26 graduations which are made up according to the basic principles shown in FIG. 1 in connection with the formation of the graduations of the graduation carrier 11. In this case, the markings, i.e. parts of the surface area in the individual graduation fields, are so placed, that, according to the magnitude of the displacement movement performed in the plane of the drawing by the graduation carrier 10 on which, an image of the graduation carrier 11' is formed by an optical system 22 and which is provided with a linear graduation, there arises on the graduation carrier 10 a peculiar image pattern combination which differs in respect of the image pattern combinations associated with the other interval fractions of the graduation of the carrier 10. The graduation carrier 10 is sensed by a photoelectrical receiver 32 through an optical system 31. This receiver 32 is connected to an electronic evaluating means 27 which is followed in the circuit by a digital indicating stage 28. The lamps 53–56 are connected to a control circuit 57 which operates electromechanically or electronically and causes the lamps to light up briefly one after another, so that pulselike signals arising in succession at the photoelectric receiver originate from different lamps and represent the appropriate combination of image patterns. The control circuit 57 is connected to the electronic evaluating means 27 and imparts to this latter synchronization signals which are required for evaluation of the signals of the photoelectric receiver 32. In this connection, the use of semiconductor light elements, e.g. GaAs diodes, which can be switched very rapidly and briefly, is advantageous, allowing the attainment of a high sensing frequency.

It is also possible, instead of the graduation carrier 11 with its uneven graduations, to use a plurality of graduation carriers situated one beside another, all of which have the same graduation but which are staggered in relation to one another by clearly defined distances. Apart from the fact that the adjustment of such an arrangement involves considerable difficulties, the spatial extension of such an arrangement becomes so great that its use for many cases becomes problematical.

What we claim is:

1. In an optical measuring device for determining and digitally indicating the extent of movement of an object relative to a reference structure, a plurality of integrated sensing units, each sensing unit comprising first and second optically aligned graduation carriers, said first graduation carrier being secured to the reference structure, each said graduation carrier being provided with parallel linear graduations in the form of light permeable and light impermeable markings, the number of light impermeable markings per unit length on one carrier being unequal inter se to the number of light impermeable markings per unit length on the other carrier, the arrangement of the linear graduations permitting the light permeable markings on the first graduation carrier to be optically aligned with the light permeable markings on the second graduation carrier only when the first graduation carrier has been displaced relative to the second graduation carrier by a predetermined number of division units or a full numbered multiple of that number of division units, continuous illumination means adjacent said first graduation carrier optically aligned with said first and second graduation carriers for directing light through the light permeable marking of the second graduation carrier when they are optically aligned with the light permeable markings of the first graduation carrier, photoelectric means optically aligned with the illumination means and the first and second graduation carriers to sense the presence of a continuous transmission of light through both said graduation carriers and generating an electrical signal in response to the presence of light, and electronic evaluating means connected to said photoelectric means for processing the presence or absence of an electric signal generated thereby to provide a digital output signal usable for digitally indicating the extent of movement of the object relative to the reference structure.

2. In an optical measuring device as claimed in claim 1, wherein the arrangement of linear graduations on the second graduation carriers of successive sensing units is larger in graduation by one measuring unit than on the first graduation carriers.

3. In an optical measuring device as claimed in claim 1, wherein said linear graduations have their longitudinal axes at right angles to the direction of movement to be measured.

4. In an optical measuring device as claimed in claim 1, wherein said photoelectric means comprises a photoelectric receiver positioned to consecutively sense the presence of light from a plurality of sensing units.

5. In an optical measuring device as claimed in claim 1, wherein an optical projection system is provided between the first and second graduation carriers.

6. In an optical measuring device as claimed in claim 4, wherein the optical projection system is a mirror optical system.

7. In an optical measuring device as claimed in claim 1, wherein the arrangement of the linear graduations is such that the image pattern resulting after relative movement of the graduation carriers is in the form of a single step code which is cyclic with the number of interval divisions.

8. In an optical measuring device as claimed in claim 1, wherein light conducting means are positioned adjacent the second graduation carrier to conduct the transmitted light to the photoelectric means.